United States Patent
Munro

(10) Patent No.: US 9,504,100 B2
(45) Date of Patent: Nov. 22, 2016

(54) SELECTIVE RADIATION UTILIZATION APPARATUSES FOR HIGH-EFFICIENCY PHOTOBIOREACTOR ILLUMINATION AND METHODS THEREOF

(75) Inventor: James F. Munro, Walworth, NY (US)

(73) Assignee: Munro Design & Technologies, LLC, Webster, NY (US)

(*) Notice: Subject to any disclaimer, the term of this patent is extended or adjusted under 35 U.S.C. 154(b) by 660 days.

(21) Appl. No.: 13/484,033

(22) Filed: May 30, 2012

(65) Prior Publication Data

US 2012/0306383 A1 Dec. 6, 2012

Related U.S. Application Data

(60) Provisional application No. 61/519,846, filed on May 31, 2011.

(51) Int. Cl.
| | |
|---|---|
| *H05B 37/02* | (2006.01) |
| *G02B 26/10* | (2006.01) |
| *H05B 33/08* | (2006.01) |
| *H05B 3/02* | (2006.01) |
| *G02B 27/10* | (2006.01) |

(52) U.S. Cl.
CPC .......... *H05B 33/0803* (2013.01); *G02B 26/10* (2013.01); *G02B 26/105* (2013.01); *G02B 27/1006* (2013.01); *H05B 3/02* (2013.01)

(58) Field of Classification Search
CPC ........ H05B 37/02; G02B 5/28; G02B 26/10; G02B 5/20; C12M 21/02
USPC ...... 315/152; 359/350, 359, 212.1; 435/243, 435/292.1
See application file for complete search history.

(56) References Cited

U.S. PATENT DOCUMENTS

| | | | |
|---|---|---|---|
| 4,235,043 A | 11/1980 | Harasawa et al. | |
| 4,324,068 A | 4/1982 | Anthony | |
| 5,035,077 A | 7/1991 | Palmer | |
| 5,062,693 A * | 11/1991 | Beratan et al. | 359/241 |
| 5,209,012 A | 5/1993 | Palmer | |
| 5,381,075 A | 1/1995 | Jordan | |
| 6,156,561 A | 12/2000 | Kodo et al. | |
| 6,603,069 B1 * | 8/2003 | Muhs | C12M 21/02 126/683 |
| 7,484,857 B2 * | 2/2009 | Bozler et al. | 359/529 |
| 7,763,457 B2 | 7/2010 | Dunlop et al. | |

(Continued)

FOREIGN PATENT DOCUMENTS

WO WO 2010/114868 * 7/2011

OTHER PUBLICATIONS

Texas Intruments, "TALP1000B Dual Axis Analog MEMS Pointing Mirror", 2009, pp. 1-2.*

(Continued)

*Primary Examiner* — Crystal L Hammond
*Assistant Examiner* — David Lotter
(74) *Attorney, Agent, or Firm* — LeClairRyan, a Professional Corporation

(57) ABSTRACT

A selective radiation utilization apparatus includes an optical filtering device and a modulation device. The optical filtering device transmits one or more selected spectral bands of incoming solar radiation and reflects one or more remaining bands of the incoming solar radiation. The modulation device spatially modulates one of the one or more selected spectral bands or the one or more remaining bands and directs the spatially modulated one of the one or more selected spectral bands or the one or more remaining bands towards a target of illumination.

18 Claims, 11 Drawing Sheets

(56) References Cited

U.S. PATENT DOCUMENTS

| | | | |
|---|---|---|---|
| 7,833,782 B2 | 11/2010 | Shvabsky et al. | |
| 7,851,211 B2 | 12/2010 | Lu | |
| 7,895,790 B2 | 3/2011 | Lin | |
| 2004/0227822 A1* | 11/2004 | Cartlidge | G01N 21/6458 348/207.99 |
| 2005/0051205 A1* | 3/2005 | Mook | 136/255 |
| 2006/0022214 A1* | 2/2006 | Morgan | F21K 9/00 257/99 |
| 2006/0203209 A1* | 9/2006 | De Vaan | H04N 9/3117 353/84 |
| 2007/0251569 A1* | 11/2007 | Shan et al. | 136/246 |
| 2008/0044887 A1 | 2/2008 | Maltezos et al. | |
| 2009/0014053 A1* | 1/2009 | Schulz | 136/246 |
| 2009/0221057 A1* | 9/2009 | Kennedy | 435/286.5 |
| 2010/0186818 A1* | 7/2010 | Okorogu | H01L 31/0547 136/259 |
| 2010/0255458 A1* | 10/2010 | Kinkaid | 435/3 |
| 2011/0083741 A1* | 4/2011 | Munro | 136/259 |
| 2011/0083742 A1 | 4/2011 | Munro | |
| 2011/0126889 A1* | 6/2011 | Bourke, Jr. | H01L 31/055 136/253 |
| 2012/0057324 A1* | 3/2012 | Martinez Anton | F21S 8/006 362/2 |
| 2012/0160300 A1* | 6/2012 | Munro | 136/246 |

OTHER PUBLICATIONS

Philips et al., "Growth Rate of Chlorella in Flashing Light", Plant Physioliol, 29:152-161 (1954).

Matthijs et al., "Application of Light-Emitting Diodes in Bioreactors: Flashing Light Effects and Energy Economy in Algal Culture," Biotechnology Bioengineering 50:98-107 (1996).

Gordon et al., "Ultrahigh Bioproductivity From Algae", Appl. Microbiol Biotechnol 76:969-975 (2007).

* cited by examiner

SELECTIVE RADIATION UTILIZATION APPARATUSES FOR HIGH-EFFICIENCY PHOTOBIOREACTOR ILLUMINATION AND METHODS THEREOF

This application claims the benefit of U.S. Provisional Patent Application Ser. No. 61/519,846 filed May 31, 2011, which is hereby incorporated by reference in its entirety.

FIELD

This technology generally relates to methods and apparatuses for utilizing solar radiation and, more particularly to methods for capturing and converting broadband solar radiation to one or more wavelength bands and then modulating the one or more wavelength bands for illuminating a photobioreactor with the reformatted light for maximum algae growth.

BACKGROUND

Several geo-political factors have recently made the synthesis of bio-fuels an attractive alternative to conventional sources of crude oil. For example, political unrest in many countries supplying oil has resulted in unanticipated interruptions in oil shipments. Additionally, global warming caused by increasing atmospheric $CO_2$ levels which in turn is caused by burning fossil fuels with no corresponding re-absorption of the $CO_2$ is beginning to profoundly affect the atmosphere. Thirdly, the supply of oil has reached a tipping point where demand now exceeds supply, and the price of oil is expected to continue to rise until the supply of oil is exhausted. Nonetheless, the world's economies cannot quickly change from fuels based on oil to other sources of energy, so oil is expected to remain in high demand for at least the next few decades.

All of these factors have motivated the search for alternate sources of oil, particularly sources based on green technologies in which the synthesis of the oil uses $CO_2$ from the atmosphere or otherwise sequestered from industrial processes or the combustion of fossil fuels.

One green oil-producing technology utilizes algae from which lipids and other organic molecules can be harvested and used as feedstock for reactors in which bio-fuels (e.g., diesel fuel) are produced. The key to the successful implementation of this technology is that the algae growth process must be low-cost and efficient, whereby the raw materials for accelerated algae production—nutrients, $CO_2$, and light—are applied to the photobioreactor in the right quantities and at the right time. Further, since algae is a living organism, the growth environment must preclude the presence of competing organisms and organisms and materials that can otherwise hinder the accelerated growth of the algae.

Recent developments in this area include the article by Gordon, et al, *Ultrahigh Bioproductivity from Algae*, Appl Microbiol Biotechnol 76:969-975 (2007), which is herein incorporated by reference in its entirety, which discloses how low duty factor high peak irradiance illuminating light can greatly accelerate algae growth. However, an efficient mechanism of generating the prescribed illumination has not been presented. Further, there is no discussion or suggestion of an efficient and effective mechanism for generating the prescribed illumination from solar radiation.

Other developments in this area include a, "Method for Improved Plant Growth" disclosed in U.S. Pat. No. 5,209,012 to Palmer, which is herein incorporated by reference in its entirety, and discloses lighting cycled on and off for predetermined periods for plant growth. To illustrate these developments, an example of a prior art light delivery system for a bioreactor is illustrated in FIG. 1. This prior art light delivery system has a photovoltaic panel 90 that collects solar radiation and coverts it to electrical power and a DC generator 92 that generates electrical power during those times the sun is not available. Batteries 91 are used to store the electrical power produced by the photovoltaic panel 90 or the DC generator 92. This prior art light delivery system also includes a connection to the local A/C power source 94 which provides alternating current electrical power to an AC-to-DC converter 93 whose output is connected to direct current bus 95. The direct current bus 95 routes the DC electrical power to the broadband lights 96. The output of the batteries 91 and DC generator 92 also can be connected to and provide electrical power to the direct current bus 95.

In an exemplary operation of the prior art light delivery system for the bioreactor shown in FIG. 1, electrical power originating at the photovoltaic panel 90, the batteries 91, the DC generator 92, or the local A/C power source 94 (through AC-to-DC converter 93) is routed to the broadband light 96 through the direct current bus 95. The broadband lights 96 illuminate the photobioreactor 98 with light 97 that is continuous and without modulation, which has been shown in the prior art to be sub-optimal. Additionally, most botanical organisms are sensitive to only one or two relatively narrow wavelength bands of illuminating light and as a result the broadband illumination produced by the broadband lights 96 in this prior system is inefficient and wasteful.

SUMMARY

A selective radiation utilization apparatus includes an optical filtering device and a modulation device. The optical filtering device transmits one or more selected spectral bands of incoming solar radiation and reflects one or more remaining bands of the incoming solar radiation. The modulation device spatially modulates one of the one or more selected spectral bands or the one or more remaining bands and directs the spatially modulated one of the one or more selected spectral bands or the one or more remaining bands towards a target of illumination.

A method for selective radiation utilization includes transmitting one or more selected spectral bands of incoming solar radiation with an optical filtering device. One or more remaining bands of the incoming solar radiation are reflected with the optical filtering device. One of the one or more selected spectral bands or the one or more remaining bands are spatially modulated and directed with a modulation device towards a target of illumination.

This exemplary technology provides a number of advantages including providing apparatuses and methods for selective radiation utilization for high efficiency illumination of targets. More specifically, examples of this technology provide highly-efficient and effective methods and devices for collecting solar radiation, selecting one or more bands of wavelengths of a spectrum of the solar radiation algae uses for growth, amplitude modulating the one or more selected bands in time, and delivering the spectrally-correct modulated light to a target of illumination, such as a photobioreactor.

By way of a more specific example, this technology includes apparatuses for collecting broad-band substantially continuous solar radiation and converting the radiation into one or more relatively narrow wavelength bands whose amplitude is temporally modulated. This is accomplished with a concentrating solar collector with a spectral-splitting optical subassembly that routes the desired solar wavelengths to a scan mirror that, by virtue of its cyclical scanning capability causes the resulting illuminating light to appear to be amplitude modulated. Undesirable solar wavelengths are routed from the spectral-splitting mirror to a photovoltaic cell that converts the optical power into electrical power. The electrical power is subsequently amplitude modulated and routed to one or more LEDs that emit amplitude modulated light of a desirable wavelength.

The desired amplitude-modulated wavelengths can be directed onto a target of illumination, such as a photobioreactor for high-efficiency growth of algae or other botanical organisms. In other examples, amplitude-modulated wavelengths can be directed onto other targets of illumination, such as a chemical reactor such that it provides an optimal power source for inducing and maintaining chemical reactions or fractioning. In further examples, amplitude-modulated wavelengths can be directed into a habitable space and used for general lighting or can be used as a light-source for signage or as an indicator light.

DETAILED DESCRIPTION

Figure 1:
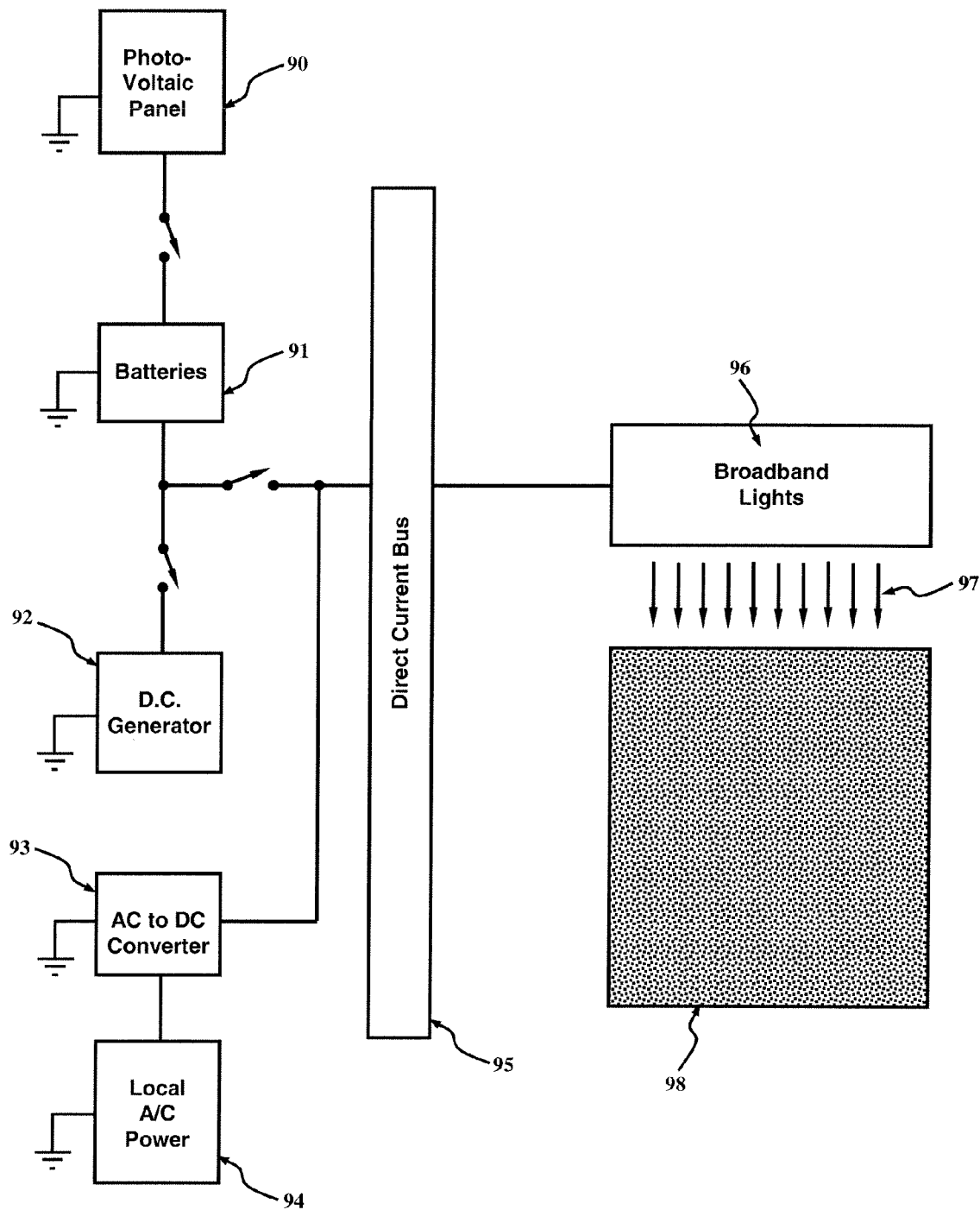
FIG. 1 is a block diagram of a prior art illumination system for improved plant growth.

An exemplary selective radiation utilization apparatus 100 is illustrated in FIGS. 2-4 and 8 The exemplary selective radiation utilization apparatus 100 includes a solar collector device 110, an electrical light delivery device 120, and an optical light modulation and delivery device 130 configured to provide illumination to a photobioreactor 16, although the apparatus can comprise other types and numbers of systems, devices, components and other elements in other configurations. This exemplary technology provides a number of advantages including providing apparatuses and methods for selective radiation utilization for high efficiency illumination of targets.

Figure 2:
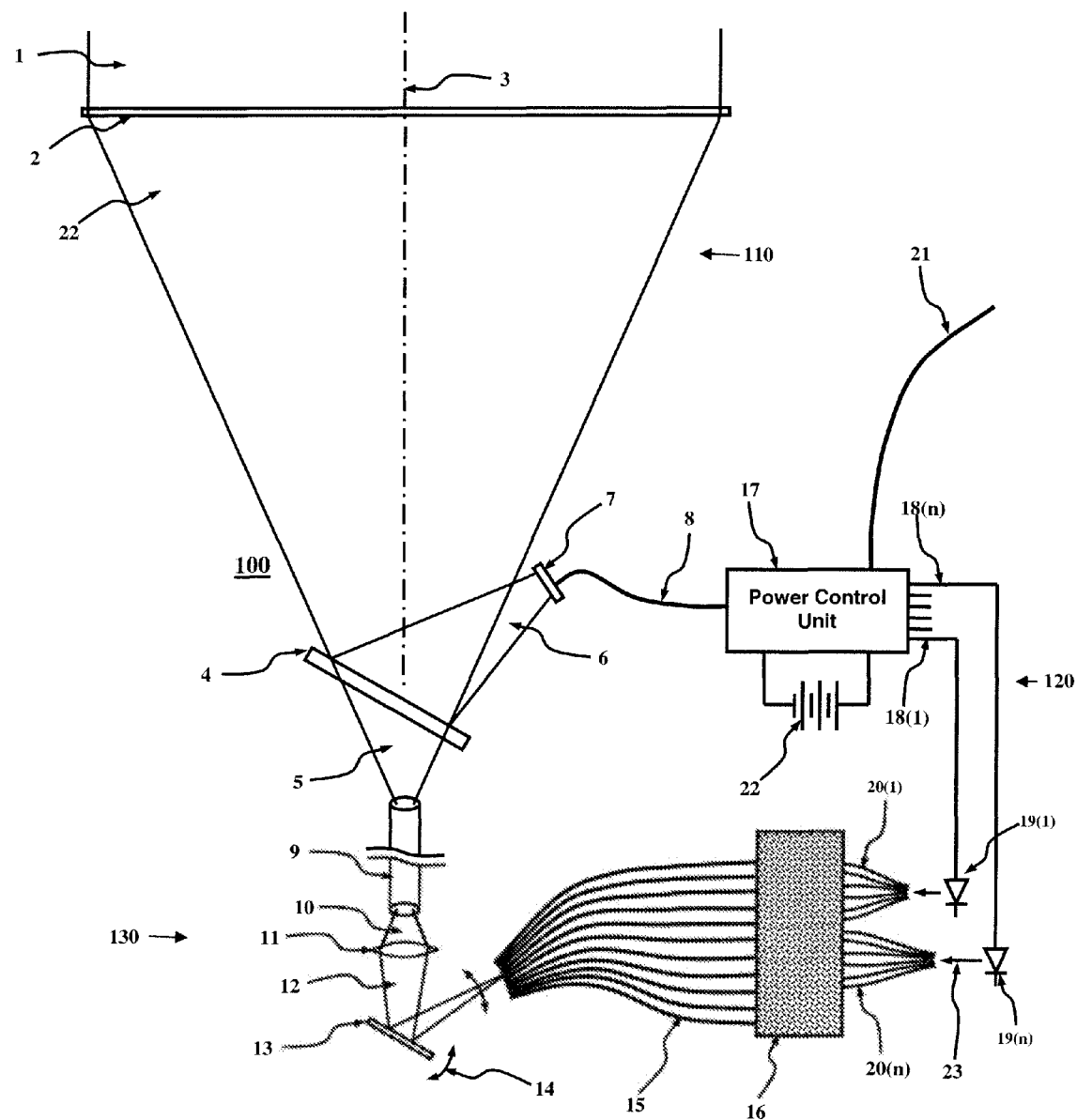
FIG. 2 is a diagram of an exemplary selective solar radiation utilization apparatus for illumination of a photobioreactor.
Figure 3:
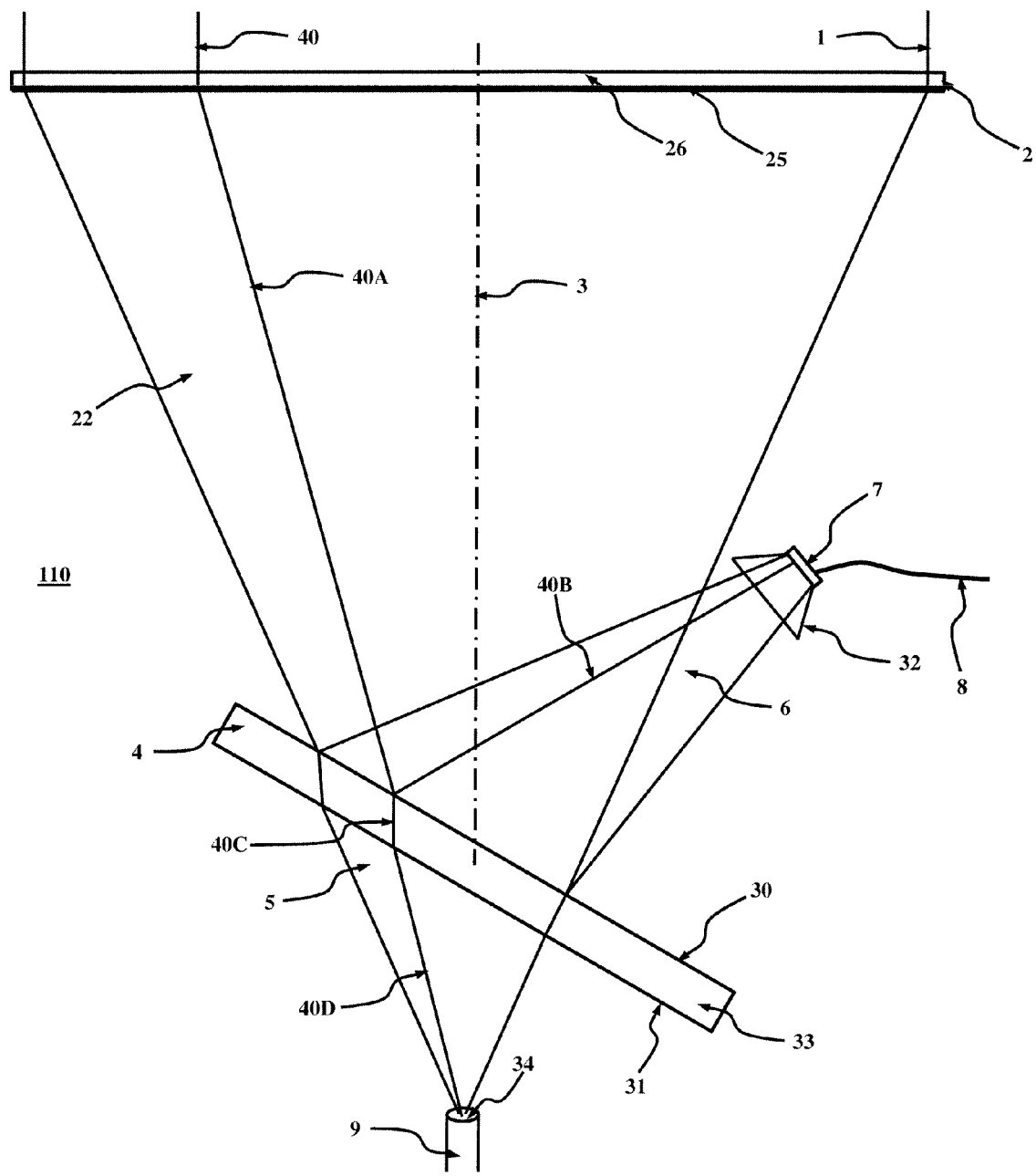
FIG. 3 is a diagram of a solar collector device and an optical filtering device in the exemplary selective solar radiation utilization apparatus shown in FIG. 2.

Referring more specifically to FIGS. 2 and 3, the solar collector device 110 includes an optical collection element 2, spectral-splitting mirror 4, photovoltaic cell (PV-cell) 7, and light-pipe 9, although the solar collector device 110 can comprise other types and numbers of systems, devices, components and other elements in other configurations. The collection element 2 of the solar collector device 110 collects incident solar radiation 1 and causes it to come to a focus or otherwise converge and become concentrated, although the spectral-splitting mirror 4 or other optical filtering device can obtain solar radiation in other manners.

The collection element 2 is a Fresnel lens made from acrylic, although other types and numbers of optical collection elements made of other types and numbers of materials, such as polycarbonate, glass, or silicone-on-glass (silicone grooves on a planar-planar glass substrate) could be used. The collection element 2 has one planar surface that normally faces the incoming solar radiation from the sun and a second surface 25 which faces away from the sun and has a series of concentric grooves that are substantially triangular or saw-tooth shaped in cross section. The slope of the primary surface of the groove that refracts the majority of the light varies from being nearly parallel to the substrate 26 at the optical center 3 of the collection element 2 comprising the Fresnel lens to being quite steep, 40 degrees or more, near the edge of the fresnel lens, although the collection element could have other configurations. In this particular example, the width of the collection element 2 ranges from about 150 mm to more than about 500 mm, although 250 mm is commonly used and other dimensions outside this range can be used.

The spectral-splitting mirror 4 has a substrate 33 onto which a reflector is installed onto its upper surface 30 and a lower surface 31 onto which is optionally installed an antireflective (A/R) layer, although the spectral-splitting mirror 4 can comprise other types and numbers of layers in other arrangements and other types and numbers of optical filtering devices can be used. For example, the reflector could be installed on the lower surface 31 and the A/R layer installed on the upper surface 30 of the spectral-splitting mirror 4. The reflector installed on upper surface 30 in this example or lower surface 31 in other examples of substrate 33 can by way of example only be a dichroic mirror or a metallic mirror. The upper surface 30 of the spectral-splitting mirror is normally planar, although the upper surface 30 can have other shapes, such as a curved prescription to enhance the uniformity of light illuminating the photovoltaic cell 7. The lower surface 31 of the spectral-splitting mirror 4 also is normally planar, although it can have other shapes, such as a curved surface prescription to enhance the focal characteristics of the light incident on the input surface 34 of the light-pipe 9 by way of example only.

The spectral reflectance characteristics of the reflector 30 is selected to transmit to the light-pipe 9 and then to the optical light modulation and delivery device 130 the "biologically preferred" wavelengths that the organisms in the photobioreactor 16 are most responsive to, and reflect all other "biologically un-preferred" solar wavelengths to the photovoltaic cell 7 such that they can be converted to electrical power, although the spectral splitting mirror 4 could have other configurations. By way of example only, the reflectance and transmittance properties of the spectral splitting mirror 4 could be reversed to transmit wavelengths of the solar radiation 1 within the convergence light cone 22 which are not useful for the photobioreactor 16 while reflecting wavelengths of the solar radiation 1 which are useful to the photobioreactor 16. This reverse configuration example would require the positions of the electrical light delivery device 120 and optical light modulation and delivery device 130 to be switched.

Figure 11:
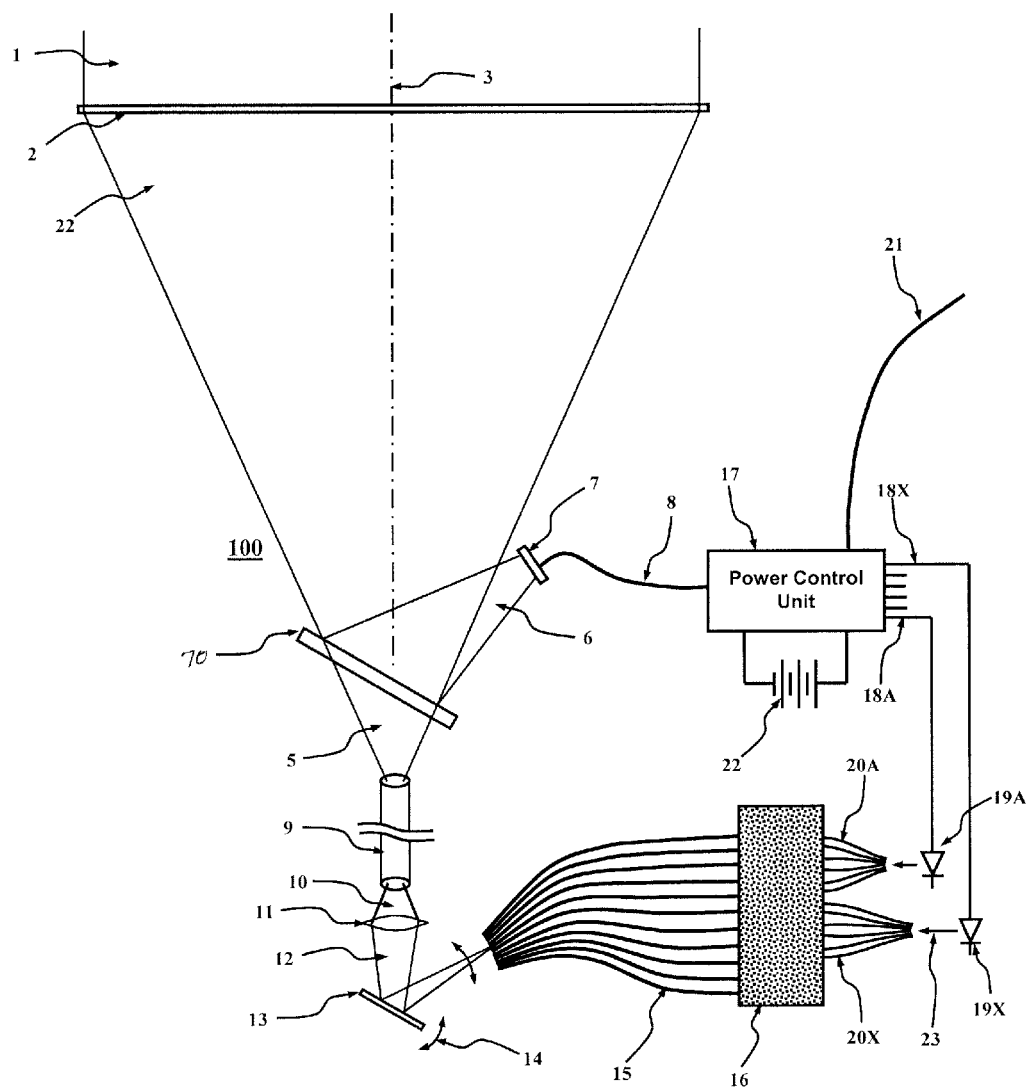
FIG. 11 is a diagram of another exemplary selective solar radiation utilization apparatus for illumination of a photobioreactor.

The spectral-splitting mirror 4 is installed at a position where the optical axis 3 of the collection element 2 runs through the spectral-splitting mirror 4 and oriented at an angle with respect to the optical axis 3, although the spectral-splitting mirror 4 could be installed at other positions with other orientations. With this positioning for the spectral-splitting mirror 4, light 6 reflected from the upper surface 30 is directed to a position outside of the incident converging light cone 22, while the transmitted light 5 passes through the spectral-splitting mirror 4 with only a small change in direction. Although a spectral-splitting mirror 4 is illustrated in this example, other types of optical filtering devices can used, such as an interference filter, a dispersing prism, or a diffractive optical element for spectrally separating the broadband solar radiation 1 by way of example only. By way of example only, a diagram of another exemplary selective solar radiation utilization apparatus for illumination of a photobioreactor is illustrated in FIG. 11. This selective solar radiation utilization apparatus is the same in structure and operation as the selective solar radiation utilization apparatus illustrated and described with reference to FIG. 2, except in this example shown in FIG. 11 the spectral-splitting mirror 4 has been replaced with an interference filter 70.

Figure 5:
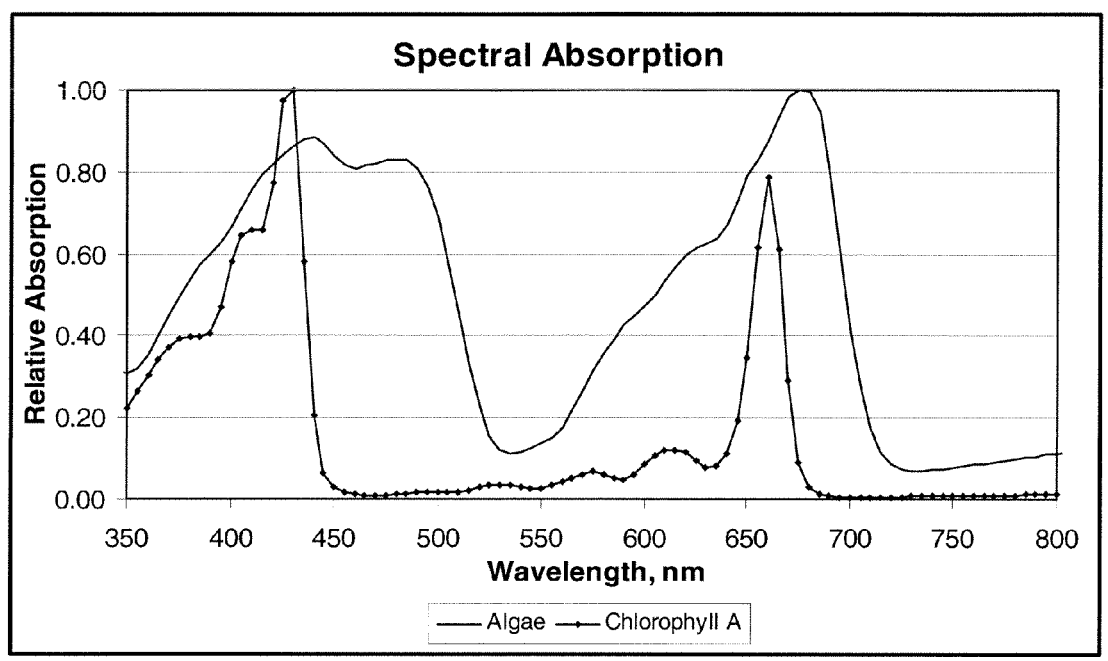
FIG. 5 is a graph of absorption spectrum of algae and chlorophyll A.
Figure 9:
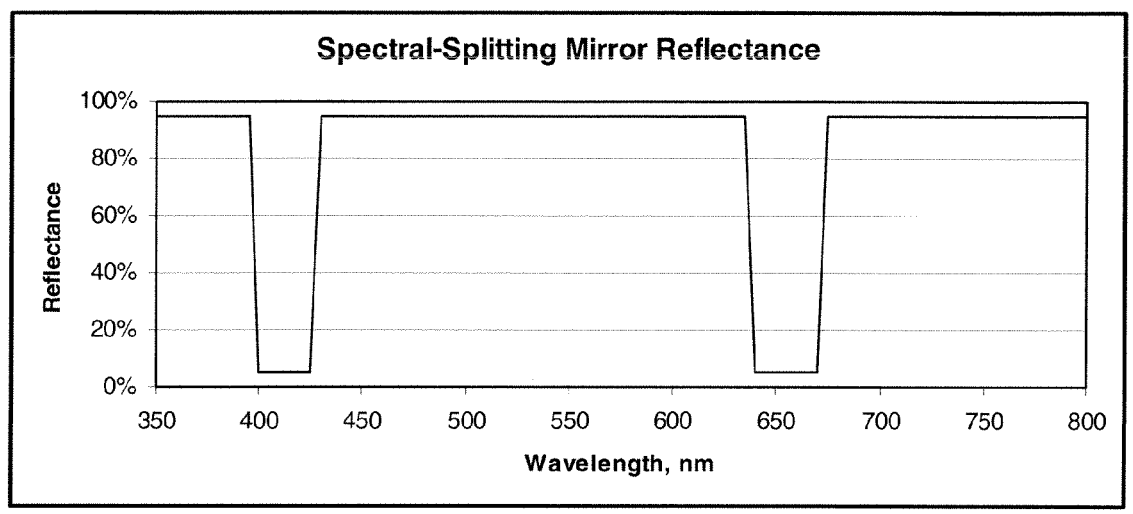
FIG. 9 is a graph of exemplary reflectance of the optical filtering device.

As seen in the graphic of FIG. 5, algae, and in particular chlorophyll A readily absorbs light in the 650 nm to 670 nm band as well as in the 400 nm to 450 nm spectral band. In this particular example, the reflector of the spectral-splitting mirror 4 is designed so these two biologically preferred spectral bands are transmitted into the optical light modulation and delivery device 130 and all other solar spectral bands are directed to the photovoltaic cell 7, although as described earlier other spectral bands could be selected for transmission or reflection. One example of a reflector that meets these requirements has the reflectance curve shown in the graph of FIG. 9. Note that the horizontal axis of the graph in FIG. 9 extends to 800 nm, although usable solar power can in fact reach 1800 nm, in which case the reflector should ideally reflect light in the 800 nm to 1800 nm region to the photovoltaic cell 7 as well.

Referring back to FIGS. 2 and 3, the spectral-splitting mirror 4 is positioned so that the reflected light 6 is still converging in accordance with the prescription of the collection element 2, and is brought to a focus, or near-focus, on photovoltaic cell 7, although the biologically un-preferred wavelengths or other non-selected spectral bands can be directed to the photovoltaic cell 7. The photovoltaic cell 7 converts the biologically un-preferred wavelengths into electrical power with high-efficiency, although other types and numbers of photovoltaic cells can be used. The photovoltaic cell 7 can be fabricated from a variety of materials, such as Silicon, Gallium-Arsenide, Indium-Gallium-Phosphide, Indium-Gallium-Phosphide, Germanium, or even from a variety of these materials formed into a multijunction photovoltaic cell 7. The illumination on the photovoltaic cell 7 is concentrated from 10× up to 1000× the irradiance of normal (non-concentrated) solar radiation 1, and must be as uniform as possible across the input surface of the photovoltaic cell 7 for optimal performance of the photovoltaic cell 7. Therefore, the input surface of the photovoltaic cell 7 is normally over-filled with light 6, necessitating the placement of secondary optics 32 about the periphery of the photovoltaic cell 7. The secondary optics 32 are mirrors that simply reflect back onto the input surface of the photovoltaic cell 7 any light that misses the photovoltaic cell 7 due to it being over-filled, or due to tracking errors in which the sun is not precisely aligned with the optical axis 3 of the collection element 2.

Figure 4:
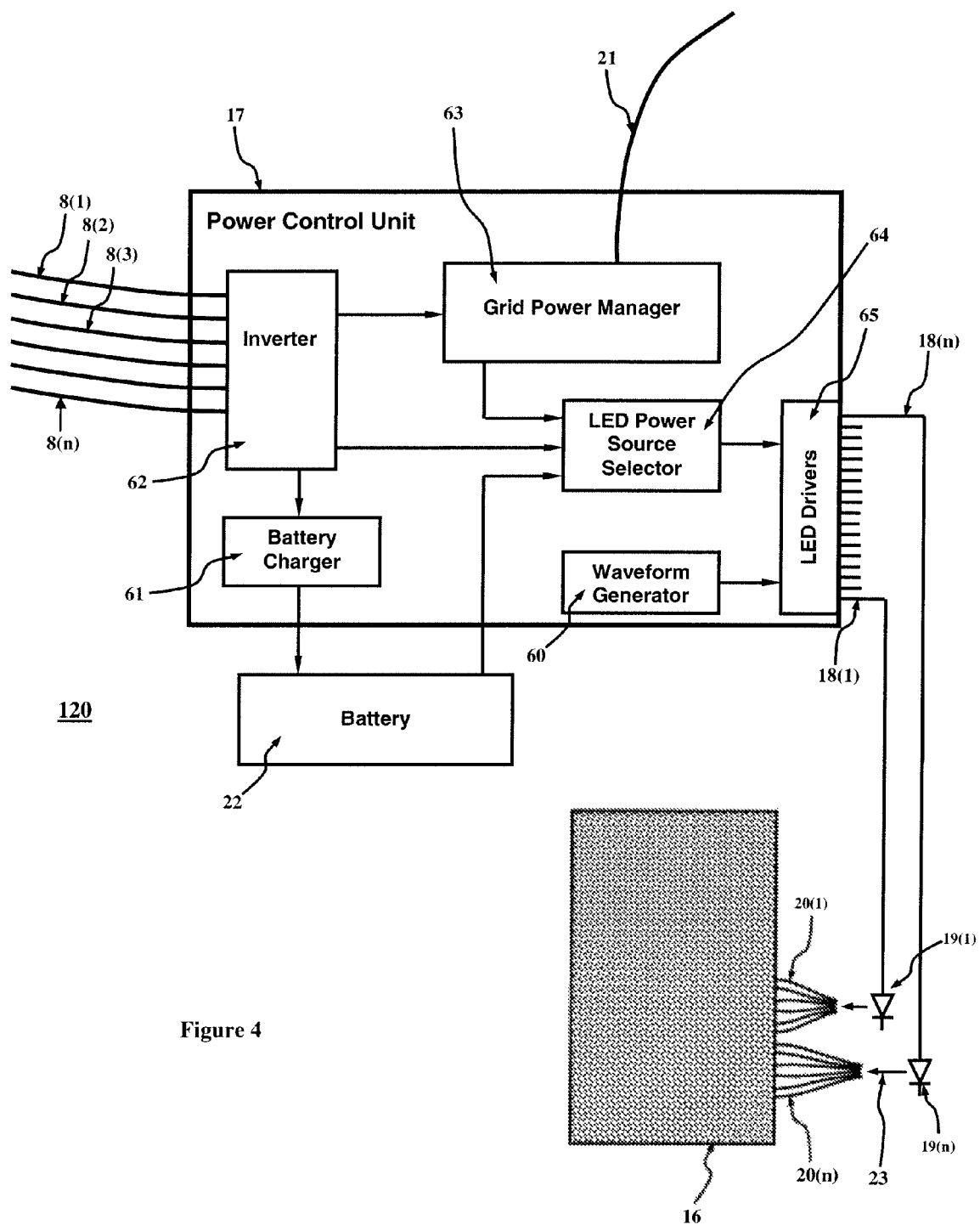
FIG. 4 is a block diagram of an electrical light delivery device in the exemplary selective solar radiation utilization apparatus shown in FIG. 2.

Referring to FIGS. 2 and 4, the electrical light delivery device 120 has an electrical conductor 8, power control unit 17, battery 22, power conductor 21, electrical conductors 18(1-n), light emitting diodes (LEDs) 19(1-n), and optional fiber-optic light guides 20(1-n), although the electrical light delivery device 120 can comprise other types and numbers of systems, devices, components and other elements in other configurations. The output from the photovoltaic cell 7 is electrical power that is carried by an electrical conductor 8 to the electrical light delivery device 120. In this particular example, the electrical power is generated from optical power contained in the reflected and converging light 6 that contains the biologically un-preferred wavelengths of light the algae or chlorophyll present in the photobioreactor 16 is not responsive to. Converting these wavelengths of optical power to electrical power captures this power that otherwise would have been wasted if it had been allowed to be directed onto the photobioreactor 16 through the optical light modulation and delivery device 130.

In addition to the benefit of capturing otherwise wasted optical power, the electrical light delivery device 120 offers some additional benefits as well. For example, it provides a means of storing electrical power in a battery 22 for powering LEDs 19(1-n) during cloudy days and at night when the sun is unavailable for use with the optical light modulation and delivery device 130. This feature allows for 'round the clock photobioreactor illumination, every day of the year. Furthermore, an electrical light delivery device 120 allows for connection to an electrical power grid to which excess electrical power can be supplied or from which electrical power can be drawn and used to power the LEDs 19(1-n) during extended sun-less periods in which the battery 22 has become depleted.

Another benefit brought by the electrical light delivery device 120 is the ability to easily amplitude modulate the light emitted by the photobioreactor-illuminating LEDs 19(1-n). From the work presented by Phillips and Myers, *Growth Rate of Chlorella in Flashing Light, Plant Physioliol* 29:152-161 (1954), and Matthijs et al, *Application of Light-Emitting Diodes in Bioreactors: Flashing Light effects and Energy Economy in Algal Culture, Biotechnol Bioeng* 50:98-107 (1996), it is now known that many plant organisms, including algae, produce lipids and other high-value molecules at a greatly accelerated rate if the illuminating light is pulsed.

Figure 6:
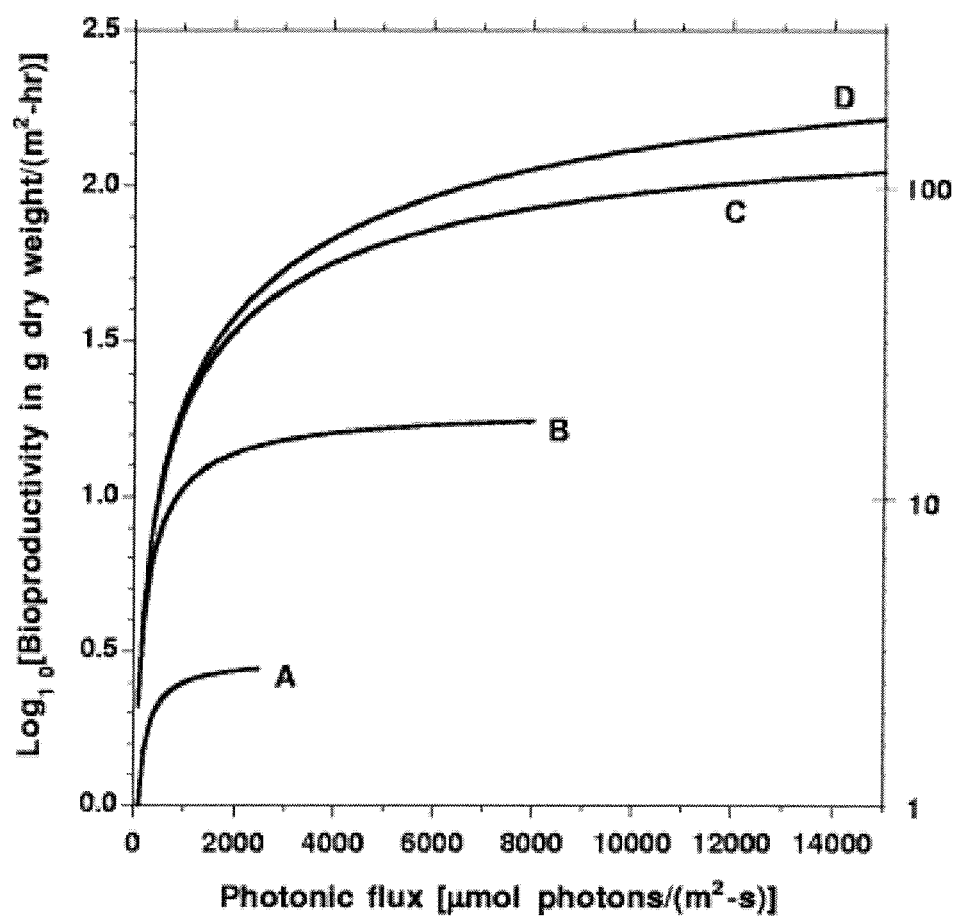
FIG. 6 is a graph of exemplary algae growth when illuminated with amplitude modulated light by the exemplary selective solar radiation utilization apparatus.

The graph presented in FIG. 6 is a family of bioproductivity curves presented in Gordon, et al, *Ultrahigh Bioproductivity from Algae, Appl Microbiol Biotechnol* 76:969-975 (2007) where the incident photonic flux, in $\mu mol/m^2$-sec, is the independent variable along the horizontal axis, and the log of the dry weight, in grams/$m^2$-hour of algae production is the dependent variable on the vertical axis. For reference, 1000 $\mu mol$ of photons=$6.022 \times 10^{20}$ photons, which, at a mean wavelength of 550 nm, is equivalent to 217.6 Watts of incident optical power.

The four curves shown in FIG. 6 represent data collected from four different algae/illumination configurations. Curve A shows the algae bioproductivity achieved in conventional commercial bioreactors, in which illumination saturation is reached at approximately 400 $\mu mol$ photons/$m^2$-sec. Any illumination above this value does not increase bioproductivity, which is approximately 2 grams/m²-hour, and the corresponding growth efficiency is 2 grams/m²-hour/400 µmol photons/m²-sec=1.39 µgrams/µmol photons. Hydrodynamic mixing of the contents of the photobioreactor 16 in which the algae is rapidly moved towards and away from the illumination allows for an increased saturation level of 2000 µmol photons/m²-sec and a corresponding increase of bioproductivity to 17 grams/m²-hour (curve B). The growth efficiency for this case is 17 grams/m²-hour/2000 µmol photons/m²-sec=2.36 µgrams/µmol photons. Curve C shows the expected bioproductivity performance of over 100 grams/m²-hour when the illumination is pulsed in accordance with the waveform shown in FIG. 7 wherein the peak illumination is 8000 µmol photons/m²-sec. The growth efficiency for this case is 100 grams/m²-hour/8000 µmol photons/m²-sec=3.48 µgrams/µmol photons. Finally, curve D shows the expected performance of a futuristic genetically engineered strain of algae illuminated under ideal pulsed lighting conditions. From this data, flashing, pulsing, or otherwise amplitude-modulating the output of the LEDs 19(1-n), or any source of illumination in a prescribed fashion can achieve a 250% increase in algae production per unit photonic illumination power, and is another component of this exemplary technology.

Figure 7:
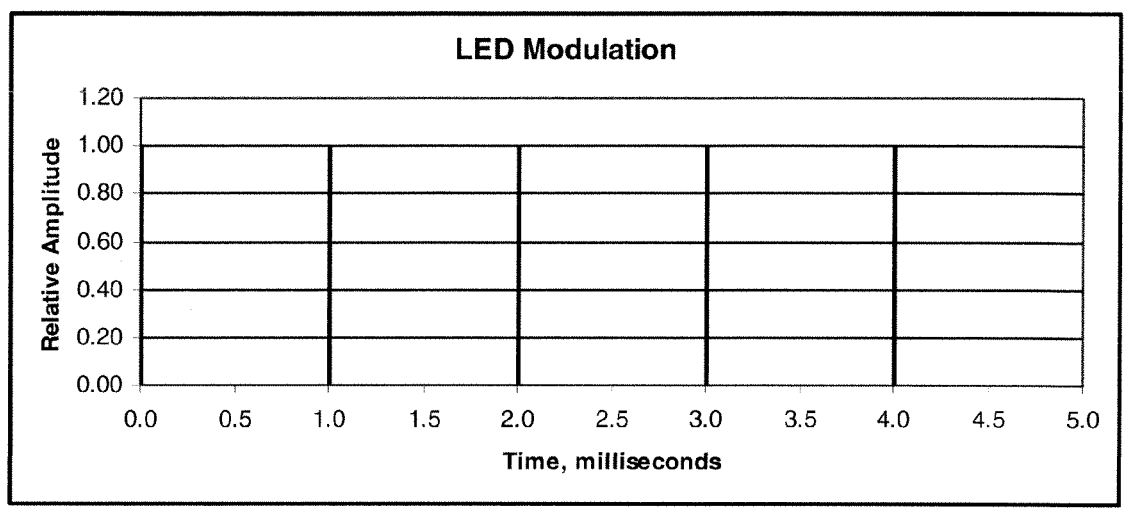
FIG. 7 is a graph of exemplary LED emission by the electrical light delivery device as a function of time.

One exemplary LED amplitude modulation waveform is illustrated in FIG. 7. With this exemplary LED amplitude modulation waveform from the waveform generator 60 to the LED drivers 65 the light from each of the LEDs 19(1-n) is turned to an on state for approximately 10 µs, and then to an off state for approximately 1 ms, and then back to an on state again for another 10 µs, and so on. This optical emission pattern can be obtained from LEDs 19(1-n) by modulating their supplied electrical power in accordance with the desired pattern, which can be readily accomplished, with high efficiency, with the waveform generator 60 to the LED drivers 65, although other manners for switching and amplitude modulating the output of the non-solar radiation from LEDs 19(1-n) can be used. For example, the same effect also could be achieved with a continuous source of non-solar light where the non-solar light is mechanically chopped or mechanically scanned across the input surface of a photobioreactor 16.

Returning more specifically to FIG. 4, the power control unit 17 includes an inverter 62, battery charger 61, grid power manager 63, LED power source selector 64, waveform generator 60, and LED drivers 65, although the power control unit 17 can include other types and numbers of systems, devices, components, and other elements in other configurations. The power control unit 17 also has connections to a battery 22, the power grid through power conductor 21, the photovoltaic cell 7 through conductors 8(1-n), and to the LEDs 19(1-n) through electrical conductors 18(1-n), although the power control unit 17 can be coupled to other types and numbers of systems, devices, components, and other elements. In this particular example, there is one power control unit 17 per solar collector device 110, although the other configurations could be used, such as several solar collector devices 110 per power control unit 17, one power control unit 17 per photobioreactor 16, or several photobioreactors 16 per power control unit 17 by way of example only.

The inverter 62 is coupled to accept as an input the low-voltage high-amperage DC electrical power from the photovoltaic cell 7 and converts it to AC electrical power that can be readily used for any downstream purpose, such as supplying power to the power grid via the power conductor 21, charging the battery 22 with battery charger 61, or powering the LED drivers 65 by way of example only. The inverter 62 can be configured to accept output from just one photovoltaic cell 7 as shown in this example or from several photovoltaic cells wired in a variety of configurations, such as series, parallel, or series-parallel configuration. The output of the inverter 62 is nominally 120 Volts AC, 60 Hz, and is in phase with the power grid, although other voltages, frequencies, and phases can be used as needed for efficient operations of the battery charger 61 and LED drivers 65 within the power control unit 17.

The battery charger 61 is coupled to accept electrical power from the inverter 62 and converts it from AC to DC, and to the appropriate voltage and current for efficient charging of the battery 22. The battery charger 61 also monitors the charge state of the battery 22, and if the battery 22 is fully charged then the battery charger 22 terminates the battery charging operation, in which case battery charging electrical power can be diverted to the power grid by the grid power manager 63.

The battery 22 is used to store electrical power that is created in excess by the photovoltaic cell 7 during extended periods of high solar radiation and then is used to supply power when the sun becomes unavailable for powering the electrical light delivery device 120. The battery 22 is selected to have sufficient capacity to power a large bank of LEDs 19(1-n) for an extended period of time, although other types and numbers of batteries or other energy storage devices could be used. In this particular example, the energy capacity for a battery 22 supplying electrical power to the LEDs 19(1-n) associated with a single power control unit 17 can range from 1 KWatt-hour to 100,000 KWatt-hours. A battery 22 with this type of storage capacity could not fit within the power control unit 17 and thus would be outside of an enclosure for the power control unit 17.

The grid power manager (GPM) 63 manages controlling a flow of electrical power to and from the electrical power grid, although the grid power manager could have other types and numbers of functions. In this particular example, the grid power manager 63 is a switch that routes excess electrical power created by the photovoltaic cell 7 during extended periods of sunshine to the power grid through power conductor 21 when the batteries 22 are fully charged. Alternately and optionally, the grid power manager 63 can be used to conduct electrical power from the grid to the LEDs 19(1-n) through the LED drivers 65 when the batteries 22 are drained of electrical power and the photovoltaic cell 7 are not providing electrical power because of extended periods of little or no sunshine 1.

In this particular example, the electrical outputs of each of the grid power manager 63, the inverter 62, and battery 22 are input to the LED power source selector 64, although other types and numbers of sources of power can be coupled to the LED power selector 64. The LED power source selector 64 is a switch that routes to the LED drivers 65 one of the sources of electrical power for powering the LEDs 19(1-n) based on a programmed order to follow, although other manners for selecting a power source can be used. For example, if solar radiation 1 is not available, there is no electrical power coming from the inverter 62, and the battery 22 has an electrical charge, then the LED power source selector 64 will connect the battery 22 to the LED drivers 65 so that the battery 22 provides electrical power for powering the LEDs 19(1-n). Alternately, if solar radiation 1 is available and there is electrical power coming from the inverter 62, the LED power source selector 64 will connect the inverter 62 to the LED drivers 65 so that the inverter 62 provides electrical power for powering the LEDs 19(1-n). Optionally, if solar radiation 1 is not available, there is no electrical power coming from the inverter 62, and the battery 22 does not have an electrical charge, then the LED power source selector 64 can connect the LED drivers 65 to the power grid through the grid power manager 63 so that the power grid provides electrical power for powering the LEDs 19(1-n).

The waveform generator 60 is coupled to the LED drivers 65 and creates a low-power electrical timing signal for the LED drivers 65 to control when each of the LEDs 19(1-n) is either in an on state or an off state. In one exemplary configuration, one and only one of the illuminating LEDs 19(1-n) will be in an on state at any time, although other configurations can be used. In this way the flow of electrical power through the LED power source selector 64 from the selected power source, in this particular example one of the battery 22, inverter 62, or power grid via power conductor 21, will be smooth and have a peak electrical power draw that is substantially the same as the average electrical power draw, which provides for the efficient utilization of the electrical power within the LED power source selector 64 and LED drivers 65. For example, if there are 100 LEDs being powered by the power control unit 17, such that LED 19(1) corresponds to LED number one and LED 19(n) corresponds to LED number 100, and if the LED waveform modulation illustrated in FIG. 7 is used, then each of the 100 LEDs will be on for 10 μs, in sequence, in every 1 ms interval. Although the number of LEDs in this example is 100, the actual number can vary from as few as two to as many as 1,000,000 or even more. If a large number of LEDs is used, such as 10,000, it may become necessary to illuminate more than one LED at any one time. This is acceptable, although ideally the number of LEDs illuminated at any given time should be kept constant so the electrical loading is made uniform, as described earlier.

The LED drivers 65 include an array of electronic switches, although other types and numbers of drivers could be used. Normally there is one switch in the LED drivers 65 for each one of the LEDs 19(1-n), although several of the LEDs 19(1-n) can be connected to one switch in the LED drivers 65 if required. Each switch of the LED drivers 65 receives an on signal or an off signal from the waveform generator 60 that tells the switch to turn on or off in accordance with the LED emission waveform shown in FIG. 7. The switch itself can be a bipolar junction transistor (BJT), field effect transistor (FET), or a MOSFET, although other types of switches can be used. The power supplied to the LED Drivers 65 from the LED power source selector 64 is routed to each switch of the LED drivers 65 which then either conducts or does not conduct electrical power to the associated one of the LED(s) 19(1-n) in accordance with the LED emission waveform shown in FIG. 7, although manners for switching the power can be used.

The LEDs 19(1-n) are an array of high-flux light-emitting-diodes that emit "biologically preferred" non-solar light of a wavelength that the algae is highly responsive to and amplitude modulated in accordance with the waveform of FIG. 7, although the LEDs 19(1-n) could be selected to have other types of emissions with other on state durations and duty factors. For example, algae and chlorophyll A are known to be responsive to and grow rapidly when illuminated with red wavelengths in the 660 nm region, which closely matches the emission spectra of the LHW5AM "Golden Dragon" LED produced by Osram Opto Semiconductors. The LHW5AM LED can also be amplitude modulated, producing 735 mW of radiant output optical power when powered with 2.6 W of electrical power, although the peak optical power can be increased substantially when the LED is pulsed. Many LEDs, including the LHW5AM, can operate more efficiently when pulsed with low duty factor waveforms, such as the waveform shown in FIG. 7.

Algae and chlorophyll A are also known to be responsive to and grow rapidly when illuminated with blue wavelengths in the 440 nm region, which closely matches the emission spectra of the LDCN5M LED produced by Osram Opto Semiconductors. The LDCN5M LED can also be amplitude modulated, producing 360 mW of radiant output optical power when supplied with 950 mW of electrical power, although the peak optical power can be increased substantially when the LED is pulsed.

The required peak irradiance on the photobioreactor 16 determines the number of LEDs 19(1-n) required to illuminate a given area of photobioreactor 16. In further consideration of curve C of FIG. 6, the peak illumination of 8000 μmol photons/$m^2$-sec corresponds to an optical irradiance level of 1740 Watts/$m^2$ (at an average wavelength of 550 nm). Since the emission pattern of FIG. 7 has a duty factor of 1:100, the average irradiance across the bioreactor is actually 17.4 Watts/$m^2$. Nonetheless, in this particular example the LEDs 19(1-n) are designed to deliver the peak non-solar irradiance on demand, under the control of the waveform generator 60 and LED drivers 65. Given a peak irradiance requirement of 1740 Watts/$m^2$, and an average radiant output power per LED of 548 mW (the average output of the LDCN5M and the LHW5AM, which implies half of the LEDs 19(1-n) will provide 440 nm light and the other half 660 nm light), some 3180 LEDs will be required per square meter of surface area of the photobioreactor 16. If the illuminated surface of the photobioreactor 16 is square, then a square 56×56 array of LEDs 19(1-n) over a square meter of photobioreactor surface, modulated in accordance with FIG. 7, will achieve optimal algae bioproductivity.

Figure 8:
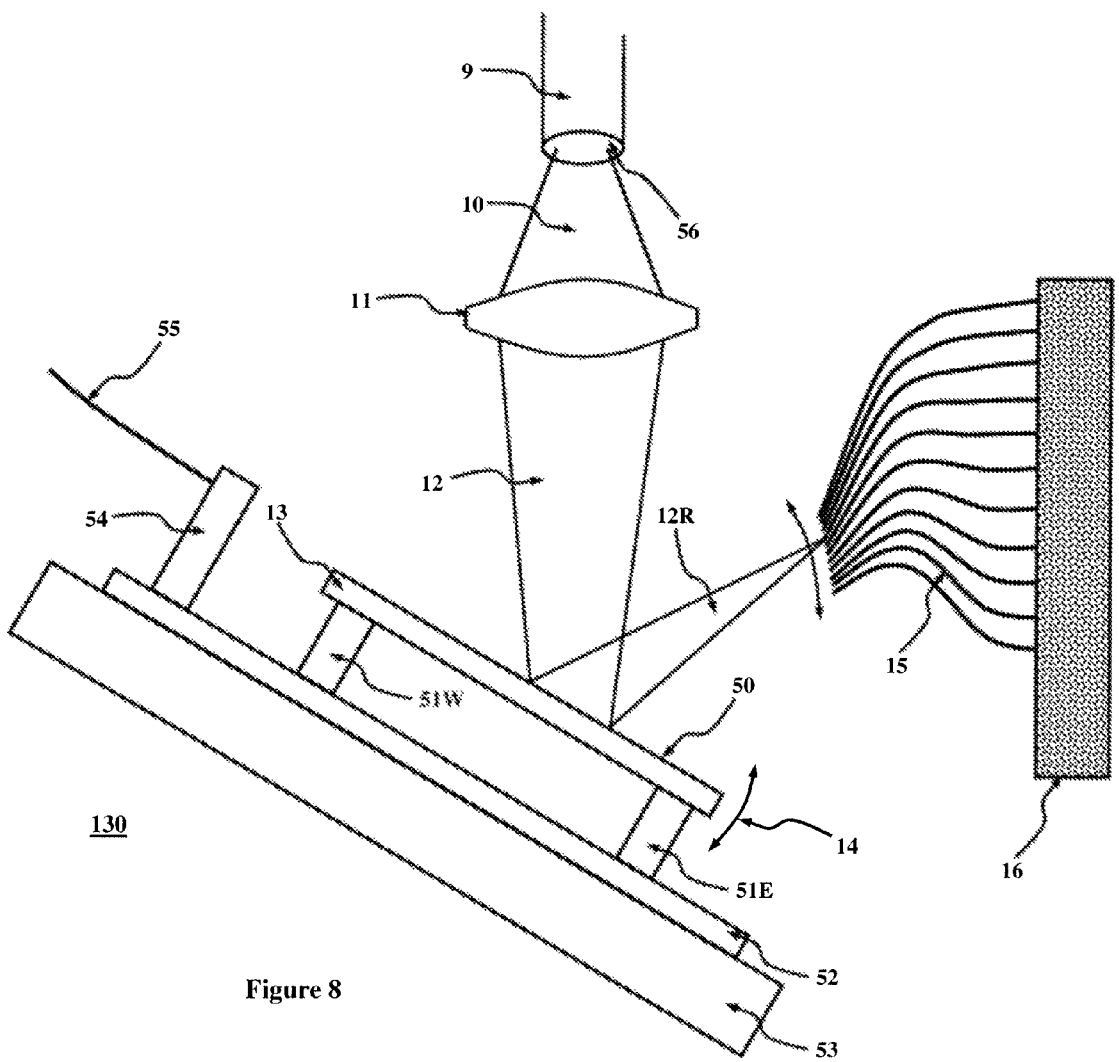
FIG. 8 is a diagram of a spatial modulating device and an optical light delivery device in the exemplary selective solar radiation utilization apparatus shown in FIG. 2.

Referring to FIGS. 2, 3, and 8, the optical light modulation and delivery device 130 has a lens 11, scanning mirror 13, and fiber-optic light guides 15, although the optical light modulation and delivery device 130 can comprise other types and numbers of systems, devices, components and other elements in other configurations. Converging light 5 that is transmitted through the spectral-splitting mirror 4 of the light collection system 110 is brought to a focus on the input surface 34 of the light-pipe 9. The light-pipe 9 is a highly transmissive optical component that utilizes Total Internal Reflectance (TIR) to prevent light from escaping, once that light 5 enters the light-pipe 9 through the input surface 34. The input surface 34 of the light-pipe 9 can be coated with an anti-reflection (A/R) layer to minimize fresnel reflections from this surface which would otherwise reduce the amount of light passing through the optical light modulation and delivery device 130. The light-pipe 9 is generally round in cross section, having a diameter from between 1 mm to greater than 20 mm, although 5 mm is commonly used and other types and numbers of light delivery devices with other dimensions can be used. The light-pipe 9 is used for transporting light from the solar collector system 110, which is normally situated outdoors some distance away from the photobioreactor 16 which is normally located indoors. As such, the light-pipe 9 can be from a few meters in length up to several hundred meters in length or more.

As seen in FIG. 8, light 10 exits the output surface 56 of the light pipe 9 in a divergent fashion, whose output angle is approximately the same as, or slightly greater than, the angular width of the converging light 5 entering the light-pipe 9. Since the exiting light 10 is divergent, a lens or system of lenses 11 is employed to collect the divergent exiting light 10 and cause it to become refocused light 12 that is once again converging, although other manners for directing the light to the target of illumination can be used.

The scanning mirror 13 is positioned to received the refocused light 12 and when activated causes the refocused light 12 to be directed into a different direction in accordance with the angular rotational angle of the scanning mirror 13, although other types of modulation devices can be used. The scanning mirror 13 can be realized in one of several possible embodiments, including, but not limited to, a voice coil actuator, a rotating polygonal mirror often used in barcode scanners, or as a standalone module such as the TALP1000B Dual-Axis Analog MEMS Pointing Mirror from Texas Instruments. The TALP1000B is particularly attractive because it can cause the refocused light 12 to be scanned in two dimensions (instead of just one as with the polygonal mirror), it is highly reflective, and provides for extremely fast scanning and steering of the reflected refocused light 12R.

At or near the focal plane of the scanned and reflected refocused light 12R is an array of optional fiber-optic light-guides 15, whose input surfaces are substantially orthogonal to an axial line that passes through the center of the scan mirror 13, although other manners for directing the selected spatially modulated bands of spectral radiation to the target of illumination can be used. The scan mirror 13 is controlled such that its angular orientation is varied so that the refocused light 12R first enters one fiber of the array, then a second, and so on, until all of the fibers have been illuminated in sequence, at which time the scan cycle is repeated.

The fibers 15 carry the refocused light 12R incident on them to the photobioreactor 16, where the light leaves the fibers 15 through an exit surface and enters the photobioreactor 16 whereupon the algae growing within the photobioreactor 16 is illuminated. The fibers 15 are spaced somewhat apart at the photobioreactor 16 so that the light exiting from one fiber has minimal overlap with light that exits from an adjacent fiber.

Figure 10:
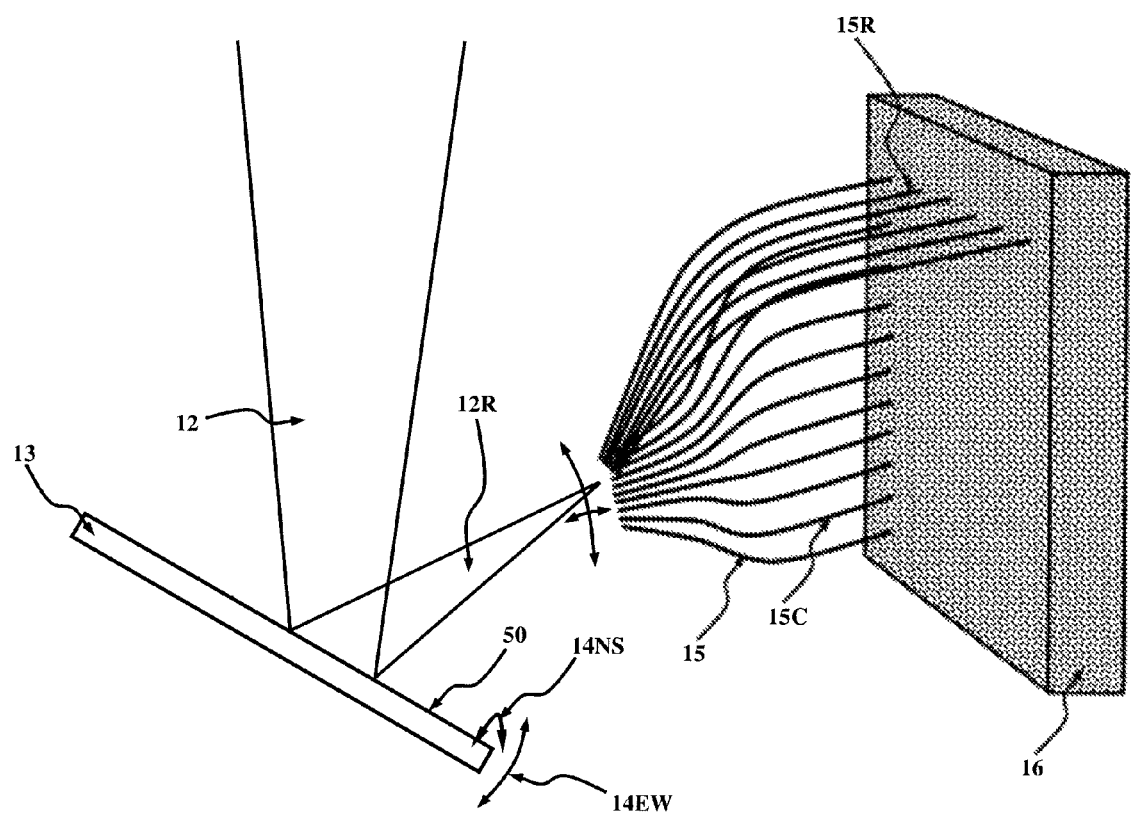
FIG. 10 is a diagram of an exemplary interface of the optical light delivery device shown in FIG. 8 with a photobioreactor.

Referring to FIG. 10, the three-dimensionality of the scan mirror 13 and the array of optical fibers 15 is illustrated. Note that of the array of optical fibers 15, FIG. 10 only shows one row 15R of fibers and one column 15C of fibers for clarity (the actual number of optical fibers in this example is therefore R×C). The entrance surface of the array of fibers 15 is positioned to efficiently receive the reflected refocused light 12R reflected from the scan mirror 13 (which rotates along two axis, 14EW and 14NS). The exit surfaces of the optical fibers 15 are positioned at the entrance surface of the photobioreactor 16, and are spaced apart from one another so that the entrance surface to the photobioreactor 16 is substantially uniformly illuminated (although only one, or at least a very few, of the fibers will be carrying optical power at any given time).

The scanning action of the scanning mirror 13 is used to create the illumination pattern of FIG. 7. That is, as the refocused light 12R is scanned across the array of fibers 15, each fiber entrance is illuminated for approximately 10 μs, and then an adjacent fiber entrance is illuminated for 10 μs, and so on until all of the fibers of the fiber array 15 are illuminated in sequence. If there are 100 fibers in the array of fibers 15, and each fiber is illuminated for 10 μs, then the illumination cycle lasts 1 ms in accordance with the illumination graph shown in FIG. 7. However, other illumination patterns can also be employed, having duty factors from 0.000001 to 0.5, and illumination times from 100 ns to 10 seconds.

While the illumination pattern of the electrical light delivery device 120 is achieved by turning various LEDs 19(1-n) to an on state or an off state in time, the illumination pattern of the optical light modulation and delivery device 130 is achieved by angularly repositioning the refocused light 12R so that one fiber is illuminated for a short (10 μs) time, which means that only those algae near the exit surface of the illuminated fiber is in turn illuminated for a corresponding time, after which the fiber is not illuminating for 990 μs, then illuminating for 10 μs, and so on in accordance with the illumination graph shown in FIG. 7. Note that illuminating waveform shown in FIG. 7 is just one exemplary illumination pattern, and other patterns having larger or smaller duty factors, larger or small On (or illuminating) times, or larger or smaller Off (or non-illuminating) times are possible and may be preferred depending on the needs of the botanical organisms present in the photobioreactor 16.

An exemplary operation of the selective solar radiation utilization apparatus 100 for illumination of a photobioreactor 16 will now be described with reference to FIGS. 2-10. Referring more specifically to FIGS. 2-3, in operation solar radiation 1 is incident on a collection element 2 which causes the solar radiation 1 to become concentrated along a convergence light cone 22 on the output side of the collection element 2. The converging solar radiation 1 contained within the convergence light cone 22 is incident on a spectral-splitting mirror 4, although other manners for obtaining solar radiation on the spectral splitting mirror 4 could be used.

The spectral splitting mirror 4 is configured to reflect wavelengths of the solar radiation 1 within a convergence light cone 22 which are not useful for the photobioreactor 16 into a converging light cone 6 while transmitting wavelengths of the solar radiation 1 within a convergence light cone 22 which are useful for the photobioreactor 16 into another converging light cone 5, although other types and numbers of optical filtering devices which reflect and transmit in other manners can be used. By way of example only, the reflectance and transmittance properties of the spectral splitting mirror 4 could be reversed to transmit wavelengths of the solar radiation 1 within the convergence light cone 22 which are not useful for the photobioreactor 16 while reflecting wavelengths of the solar radiation 1 which are useful to the photobioreactor 16. This reverse configuration example would require the positions of the electrical light delivery device 120 and optical light modulation and delivery device 130 to be switched.

Referring to FIGS. 2 and 4, the reflected converging light cone 6 from the spectral splitting mirror 4 contains wavelengths of the solar radiation 1 that are substantially undesirable for use for illuminating the down-stream photobioreactor 16. Accordingly, with this example of the technology the reflected converging light cone 6 is directed onto the photovoltaic cell 7 which converts these biologically unpreferred wavelengths of solar radiation 1 into electricity with high efficiency, although other types and numbers of photovoltaics can be used. The electricity generated by the photovoltaic cell 7 is carried by an electrical conductor 8 in FIG. 2 or more specifically by electrical conductors 8(1-n) as shown in greater detail in FIG. 4 to a power control unit 17, although other manners for coupling the power to the power control unit 17 can be used.

Referring more specifically to FIG. 4, the electricity from the photovoltaic cell 7 is carried by conductors 8(1-n) to an inverter 62 which converts the DC electricity carried by conductors 8(1-n) to AC electricity which can be utilized more effectively by down-stream circuits within the power control unit 17, although other manners for managing the electrical energy generated by the photovoltaic cell 7 can be used. The inverter 62 provides AC electrical power to an LED power source selector 64, an optional battery charger 61, and an optional grid power manager 63 depending on the electrical needs of the selector 64, the charger 61, and the power manager 63 and the availability of electrical power from the inverter 62, although the inverter 62 can be coupled to other types and numbers of systems, devices, components, and other elements in other configurations. The availability of electrical power from the inverter 62 is dependent upon the amount of electrical power being carried by conductors 8(1-n) which is dependent on the amount of electrical power being produced by the photovoltaic cell 7 which is dependent upon the amount of solar radiation 1 incident on the collection element 2. The amount of electrical power output by the inverter 62 is in accordance with the amount of solar radiation 1 incident on the collection element 2.

If the amount of solar radiation 1 is not substantial, in this particular example below the stored power threshold, then the LED power source selector 64 will determine if the battery 22 has a significant charge. If the LED power source selector 64 determines the battery 22 does have a charge, in this particular example a battery charge above a stored charge threshold, then the LED power source selector 64 routes the electrical power from the battery 22 to the LED drivers 65.

If the amount of solar radiation 1 is not substantial and the battery 22 does not have a significant charge, in this particular example a battery charge below the stored charge threshold, then optionally the LED power source selector 64 will direct grid electrical power available from the grid power manager 63 to the LED drivers 65, although power from other sources in other manners could be provided.

If the amount of solar radiation 1 is not substantial, the battery 22 does not have a significant charge, in this particular example a battery charge below the stored charge threshold, and the LED power source selector 64 has been directed or otherwise configured not to direct grid electrical power available from the grid power manager 63, then no electrical power will be output by the LED power source selector 64 for use in powering the LEDs 19(1-n) by way of the LED drivers 65.

If the amount of solar radiation 1 is substantial, in this particular example above a stored power threshold, then the inverter 62 will output a substantial amount of electrical power that is input to the LED power source selector 64, although other manners for managing the output power can be used. Next, the LED power source selector 64 determines that sufficient power from the inverter 62 is available and routes that electrical power to the LED power source selector 64.

During times when solar radiation 1 is substantial and inverter 61 produces more than enough electrical power for powering LEDs 19(1-n) through the LED drivers 65 and through the LED power source selector 64, then the excess electrical power will be routed from the inverter 62 to an optional battery charger 61 which in turn will charge the battery 22. The electrical charge stored within the battery 22 can then be used later during periods of non-substantial solar radiation 1 by the LED power source selector 64 and the LED drivers 65 for powering LEDs 19(1-n) as previously described.

During times when solar radiation 1 is substantial and inverter 61 produces more than enough electrical power for powering LEDs 19(1-n) through the LED drivers 65 and through the LED power source selector 64, and when the battery 22 is fully charged, then the excess electrical power will be routed from the inverter 62 to the grid power manager 63 which in turn will direct the excess electrical power from the inverter 62 onto the power grid through power conductor 21.

Accordingly, in this particular example the LED drivers 65 are coupled to receive electrical power from the LED power source selector 64 from one of the power sources described above and also to receive LED modulation waveform(s) output by the waveform generator 60, although the LED drivers 65 could be coupled to receive other types and numbers of inputs. The LED modulation waveform(s) is/are used by the LED drivers 65 to control when to turn each of the LEDs 19(1-n) on or off. An illustrative example of an LED modulation waveform is illustrated in FIG. 7. Note that while the shape (e.g., amplitude and frequency) of the LED modulation waveform is substantially the same for each of the LEDs 19(1-n), the waveform for each of the LEDs 19(1-n) may be delayed in time so that only a fraction of the LEDs 19(1-n) are in an on state to illuminate at any one time. Therefore, the outputs 18(1-n) of the LED Drivers 65 are amplitude modulated in accordance with the exemplary waveform of FIG. 7 wherein a time lag exists between the on state of the LED modulation waveform across outputs 18(1-n), and each of the outputs 18(1-n) carries enough electrical power to cause the LED(s) 19(1-n) each is connected to become illuminated when the LED modulation waveform on the corresponding one of the outputs 18(1-n) is in an on state.

When one of LEDs 19(1-n) is in an on state or energized through a signal by the LED modulation waveform from the corresponding one of the output 18(1-n), the one of LEDs 19(1-n) emits light 23 which in this example is within a biologically preferred wavelength range for the photobioreactor 16, although the LEDs 19(1) used could be adjusted to emit other wavelengths appropriate for the particular target of illumination. In this particular example, the light 23 from the LEDs 19(1-n) optionally is directed into a fiber-optic distribution network 20(1-n) which routes the light 23 to the ends of the fibers in the network 20(1-n) which output the light onto the photobioreactor 16, although other manners for directing the light to the target of illumination could be used. For example, the LEDs 19(1-n) could be directly attached to an input surface of the photobioreactor 16, provided the surface is substantially transparent to the biologically preferred wavelengths of the light produced by LEDs 19(1-n). In another example, the LEDs 19(1-n) could be immersed into the contents of the photobioreactor 16 and directly illuminate contents from inside the photobioreactor 16. Note that in this particular example, this light that is illuminating the contents of the photobioreactor 16 is amplitude modulated and of the biologically preferred wavelengths for the contents of the photobioreactor 16, although one or more other bands of non-solar radiation could be used depending on the particular application.

Referring to FIGS. 2, 3, 8, and 10, in this particular example the biologically preferred wavelengths present within the incident solar radiation 1 are transmitted through the spectral-splitting mirror 4 and form the transmitted converging light cone 5. The transmitted converging light cone 5 is brought to a focus on the input surface 34 of light pipe 9 which carries the biologically preferred wavelengths of solar radiation 1 away from the solar collector system 110 to the optical light modulation and delivery device 130, although other manners for managing the particular selected bands of wavelengths could be used.

Referring more specifically to FIG. 8, light 10 that exits the light-pipe 9 through exit surface 56 passes through a lens 11 whose output refocused light 12 is brought to a real focus some distance from the lens 11. A scanning mirror 13 placed in the path of the refocused light 12 is made to move rotationally along two axis 14NS and 14EW as shown in FIG. 10, although the scanning mirror can be configured to move along other numbers of axes, such as one axis, and in other directions. In this particular example, the scanning motion of the scan mirror 13 occurs by virtue of movement of the miniature linear actuators 51E and 51W that are connected to the scan mirror 13 and base 53 through substrate 52, although other manners for generating the scanning motion of the scanning mirror and other types of modulation device can be used. In this particular example, miniature linear actuators 51E and 51W contract or elongate when electrically energized in accordance with the magnitude and polarity of the applied electrical signal. As the lengths of the miniature linear actuators 51E and 51W change, the scan mirror 13 is caused to move rotationally causing the reflected refocused light 12R to scan spatially, thus spatially modulating the refocused light 12, although other manners for modulating the light can be used.

In this particular example, at the focal plane (which may actually be a curved surface) of the scanned, reflected, refocused light 12R, lie the input surfaces of an array of fiber optical light guides 15 as illustrated in FIGS. 8 and 10. In FIG. 10, only one column of fiber light guides 15C and one row of fiber light guides 15R is shown for clarity. As the refocused light 12R is made to scan across the input surfaces of the fiber light guides, each of the fiber optical light guides 15 conducts light to the photobioreactor 16 in sequence as its input surface is illuminated, although other manners for directing the spatially modulated wavelengths of light to the illumination target can be used.

In this particular example, the output surfaces of the fiber light guides 15 are at the input surface of the photobioreactor 16, although other configurations could be utilized, such as placing the output surfaces of the fiber light guides 15 inside the photobioreactor 16 by way of example only. In another example, the fiber light guides 15 as well an any other optical device could be entirely dispensed with and the scanned reflected refocused light 12R could be made to directly scan across the input surface of the photobioreactor 16. With any of these illustrative examples, any given location at or near the input surface of the photobioreactor 16 would see a temporally modulated illumination pattern at least somewhat in accordance with the LED modulation waveform depicted in FIG. 7. Note that in this particular example, this light that is illuminating the contents of the photobioreactor 16 is spatially modulated and of the biologically preferred wavelengths for the contents of the photobioreactor 16, although again the particular spatially modulated solar radiation can be adjusted for the particular target of illumination.

One of the benefits of this technology for this particular example is that the light delivered to the photobioreactor 16 can readily be varied in terms of total flux delivered, flux/input area (i.e., irradiance), and emission duty factor to suit the particular needs of the botanical organisms growing within the photobioreactor. For example, if the botanical organism is an algae that needs a large amount of input light, then the fiber light guides 15 could be spaced more closely together, or spaced further apart for an algae that needs a lesser amount of light (assuming that the fibers carry the same amount of flux in each case).

In the particular examples illustrated and described herein, the contents of the photobioreactor 16 have been described as being algae. In actuality the contents of the photobioreactor 16 can be an algae-laden mixture of water, $CO_2$, nutrients, and waste products such as $O_2$. When mature, the algae can be harvested for lipids and other high-value organic molecules which can then be used as feedstock for synthetic fuel production or other processes. Alternately, the algae growing within the photobioreactor 16 can be part of a water purification system, such as those associated with sewage and wastewater treatment plants, where the algae is used to process the sewage and wastewater.

Although examples with algae have been illustrated and described herein, the photobioreactor 16 can be used for cultivating any botanical organism that uses photosynthesis and which prefers to be illuminated by a relatively few spectral bands of light. Furthermore, the growth medium need not be water, but can be air (or any gaseous mixture for respiration) and soil, such as with fruits and vegetables.

The botanical organisms being cultivated or otherwise illuminated within the photobioreactor 16 can be harvested and used for a multitude of purposes, including, but not limited to feedstock for biofuels such as biodiesel, ethanol, etc., or for high value molecules such as those found in foodstuffs, perfumes, solvents, monomers and polymers.

Although in this example the target of illumination is a photobioreactor 16, this technology can be used with other types and numbers of targets of illumination, such as a continuous or non-batch oriented chemical process. In other examples of this technology, the target of illumination could be a non-biological chemical reactor whose reactants, constituents, or contents are illuminated with a relatively few spectral bands of light that are selected to provide an optimal power source for inducing and maintaining a chemical reaction, fractioning, or distilling process.

In yet other examples of this technology, the target of illumination could be a habitable space, such as an interior of a building or signage or other an indicator light, such as a traffic light, in which the provide illumination is used for lighting. In the case of habitable space, this exemplary technology would be adjusted so the selected spectral wavelengths comprise a relatively broad spectral broad band from 400 nm to 700 nm and the non-preferred spectral band, from 700 nm to approximately 1800 nm, is converted to electrical power and then converted back to optical power by way of the electrical light delivery device 120 described earlier. Wavelengths from 400 nm to 700 nm spectral band are in the visible spectral wavelength band while wavelengths from 700 nm to 1800 nm are in the infrared spectral band. Illumination for signage could involve a narrower band of wavelengths.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A selective radiation utilization apparatus, the apparatus comprising:
    an optical filtering device that transmits one or more selected spectral bands of incoming solar radiation and reflects one or more other non-selected bands of the incoming solar radiation in a different direction from the one or more selected spectral bands; and
    a modulation device that spatially modulates one of the one or more selected spectral bands and directs the spatially modulated one of the one or more selected spectral bands towards a target of illumination;
    a photovoltaic device positioned to convert the one or more other non-selected bands without the one or more selected spectral bands into electrical energy; and
    an electrical light delivery device coupled to the photovoltaic device that converts the electrical energy into modulated non-solar radiation in substantially the same one or more bands as the spatially modulated one of the one or more selected spectral bands.

2. The apparatus as set forth in claim 1 wherein the electrical light delivery device further comprises:
    an inverter coupled to the photovoltaic device;
    one or more light emitting diode drivers coupled to the inverter;
    one or more light emitting diodes each coupled to one of the one or more LED drivers; and
    a waveform generator coupled to the one or more light emitting diode drivers that generates a timing signal for an on/off state for each of the one or more light emitting diodes.

3. The apparatus as set forth in claim 2 wherein the electrical light delivery device further comprises:
    at least one battery charger coupled to the inverter;
    at least one battery coupled to the battery charger; and
    an LED power source selector coupled to select between the inverter and the battery for coupling to the one or more LED drivers.

4. The apparatus as set forth in claim 3 wherein the electrical light delivery device further comprises:
    a power conductor; and
    a grid power management device that controls flow of electrical energy to and from an electrical power grid, the grid power management coupled to the power conductor, the inverter, and the LED power source selector which selects between the inverter, the battery, and the power conductor for coupling to the one or more LED drivers.

5. The apparatus as set forth in claim 1 further comprising a solar collector device that converges at least a portion of the incoming solar radiation onto the optical filtering device.

6. The apparatus as set forth in claim 1 wherein the spatially modulated one of the one or more selected spectral bands or the one or more other non-selected bands comprises red wavelengths and blue wavelengths and the non-spatially modulated one of the one or more selected spectral bands or the one or more other non-selected bands comprises green wavelengths and infrared wavelengths.

7. The apparatus as set forth in claim 1 wherein the optical filtering device further comprises an interference filtering device.

8. The apparatus as set forth in claim 1 wherein the optical filtering device further comprises a substrate with reflective layer on one outer surface and an anti-reflective layer on an opposing outer surface, the reflective layer transmits one or more selected spectral bands of incoming solar radiation and reflects one or more other non-selected bands of the incoming solar radiation.

9. The apparatus as set forth in claim 8 wherein the optical filtering device further comprises a solar light redirection device which focuses the one or more selected spectral bands of the solar radiation on the modulation device.

10. The apparatus as set forth in claim 9 wherein the solar light redirection device further comprises:
    a light pipe positioned to capture the one or more selected spectral bands of the solar radiation passing through the substrate; and
    a lens positioned to focus the one or more selected spectral bands of the solar radiation exiting the light pipe on the modulation device.

11. The apparatus as set forth in claim 1 wherein the modulation device comprises a scanning mirror positioned to receive one of the one or more selected spectral bands or the one or more other non-selected bands.

12. The apparatus as set forth in claim 1 wherein the target of illumination is a photobioreactor.

13. A method for selective radiation utilization, the method comprising:
    transmitting one or more selected spectral bands of incoming solar radiation with an optical filtering device;
    reflecting one or more other non-selected bands of the incoming solar radiation with the optical filtering device in a different direction from the one or more selected spectral bands; and
    spatially modulating and directing with a modulation device one of the one or more selected spectral bands or the one or more other non-selected bands towards a target of illumination;
    converting with a photovoltaic device the one or more other non-selected bands without the one or more selected spectral bands into electrical energy; and
    converting with an electrical light delivery device coupled to the photovoltaic device the electrical energy into amplitude modulated non-solar radiation in substantially the same one or more bands as the spatially modulated one of the one or more selected spectral bands.

14. The method as set forth in claim 13 further comprising generating modulated non-solar radiation in the same one or more bands as the spatially modulated one of the one or more selected spectral bands or the one or more other non-selected bands of the solar radiation based on power from at least one of a battery or a conductor coupled to a power grid and directing towards the target of illumination.

15. The method as set forth in claim 13 further comprising converging at least a portion of the incoming solar radiation onto the optical filtering device with a solar collector device.

16. The method as set forth in claim 13 wherein the spatially modulated one of the one or more selected spectral bands or the one or more other non-selected bands comprises red wavelengths and blue wavelengths and the non-spatially modulated one of the one or more selected spectral bands or the one or more other non-selected bands comprises green wavelengths and infrared wavelengths.

17. The method as set forth in claim 13 wherein the target of illumination is a photobioreactor.

18. The method as set forth in claim 13 wherein the spatially modulating and directing further comprises spatially modulating and directing with a scanning mirror the one of the one or more selected spectral bands or the one or more other non-selected bands towards the target of illumination.

* * * * *